(12) United States Patent
Cho

(10) Patent No.: US 9,399,297 B2
(45) Date of Patent: Jul. 26, 2016

(54) PAD-SEPARABLE SUCTION CUP

(71) Applicant: VTEC CO., LTD., Busan (KR)

(72) Inventor: Ho-Young Cho, Seoul (KR)

(73) Assignee: VTEC CO., LTD., Busan (KR)

( * ) Notice: Subject to any disclaimer, the term of this patent is extended or adjusted under 35 U.S.C. 154(b) by 0 days.

(21) Appl. No.: 14/889,013

(22) PCT Filed: Apr. 14, 2014

(86) PCT No.: PCT/KR2014/003188
§ 371 (c)(1),
(2) Date: Nov. 4, 2015

(87) PCT Pub. No.: WO2015/159997
PCT Pub. Date: Oct. 22, 2015

(65) Prior Publication Data
US 2016/0096278 A1    Apr. 7, 2016

(30) Foreign Application Priority Data

May 24, 2013    (KR) .................. 10-2013-0059318

(51) Int. Cl.
*B25J 15/06*    (2006.01)
*F16B 47/00*    (2006.01)

(52) U.S. Cl.
CPC .......... *B25J 15/0683* (2013.01); *B25J 15/0616* (2013.01); *F16B 47/00* (2013.01)

(58) Field of Classification Search
CPC ..... B25J 15/0616; B25J 15/0683; B66C 1/02; B66C 1/0231; B65G 47/91; Y10S 901/40; F16B 47/00
USPC ........................................ 294/183, 185, 189
See application file for complete search history.

(56) References Cited

U.S. PATENT DOCUMENTS

| | | | | |
|---|---|---|---|---|
| 2,815,240 A | * | 12/1957 | Lytle ..................... | B66C 1/0212 294/189 |
| 3,627,369 A | * | 12/1971 | Nixon ................... | B66C 1/0212 294/189 |
| 3,759,560 A | * | 9/1973 | Yoda ..................... | B66C 1/0212 294/186 |
| 3,833,230 A | * | 9/1974 | Noll ..................... | B23B 31/307 269/21 |
| 3,934,916 A | * | 1/1976 | Baker ..................... | A21B 3/18 271/103 |
| 4,717,138 A | | 1/1988 | Watkiss | |

(Continued)

FOREIGN PATENT DOCUMENTS

| JP | 2012218099 A | 11/2012 |
|---|---|---|
| JP | 2014024138 A | 2/2014 |

(Continued)

OTHER PUBLICATIONS

International Search Report dated Dec. 14, 2014 from corresponding International Application No. PCT/KR2014/003188, 5 pages.

*Primary Examiner* — Dean Kramer
(74) *Attorney, Agent, or Firm* — Innovation Capital Law Group, LLP; Vic Lin

(57) ABSTRACT

Disclosed herein is a suction cup used in a vacuum system. The suction cup includes a hollow body, a skirt-shaped pad disposed under the body, and a ring-shaped clamp removably provided in the suction cup to couple the body with the pad. A concave 'C'-shaped outer surface of the clamp compresses a contact portion of the body with the pad in opposite directions upwards and downwards while surrounding the contact portion, thus coupling the body with the pad.

11 Claims, 7 Drawing Sheets

(56) References Cited

U.S. PATENT DOCUMENTS

| | | |
|---|---|---|
| 4,787,812 A | 11/1988 | Gopfert |
| 4,955,493 A | 9/1990 | Touzani |
| 5,639,553 A | 6/1997 | Nagai et al. |
| 5,882,055 A | 3/1999 | Smith |
| 6,382,692 B1 | 5/2002 | Schmalz et al. |
| 6,588,718 B2 | 7/2003 | Kalb |
| 6,612,633 B1 | 9/2003 | Tell |
| 7,364,521 B2 | 4/2008 | Yang |
| 7,607,622 B2 | 10/2009 | Carnevali |
| 7,901,164 B2 | 3/2011 | Skradski et al. |
| 8,096,537 B2 | 1/2012 | Browne et al. |
| 8,251,340 B2 | 8/2012 | Webb et al. |
| 8,534,633 B2 | 9/2013 | Tell |
| 2004/0231607 A1 | 11/2004 | Hollinger |
| 2007/0065242 A1 | 3/2007 | Skradski et al. |
| 2007/0075196 A1 | 4/2007 | Richter |
| 2007/0243031 A1 | 10/2007 | Yun |
| 2008/0078896 A1 | 4/2008 | Browne et al. |
| 2009/0057971 A1 | 3/2009 | Bumgarner et al. |
| 2012/0025053 A1 | 2/2012 | Tell |

FOREIGN PATENT DOCUMENTS

| | | |
|---|---|---|
| KR | 20110001307 U | 2/2011 |
| KR | 20120114172 A | 10/2012 |
| KR | 101303740 B1 | 10/2013 |
| KR | 20140001186 U | 2/2014 |

\* cited by examiner

Prior Art

PAD-SEPARABLE SUCTION CUP

TECHNICAL FIELD

The present invention relates to a suction cup that is utilized to hold an article in a vacuum transfer system. More particularly, the present invention relates to a structure of a pad-separable suction cup.

BACKGROUND ART

Generally, a vacuum transfer system means a system that actuates a vacuum pump with compressed air, discharges internal air from a suction cup coming into contact with a surface of an article, holds the article using negative pressure that is thus obtained, and transfers the article to a predetermined position. In this regard, the suction cup is coupled to an end of a pipe member that is separately provided, and is connected to the vacuum pump via this member. The suction cup includes a ring-shaped connector and a skirt-shaped pad coupled to a lower portion of the connector.

The pad is usually formed of a soft material such as rubber or urethane. Traditionally, the pad is integrally joined or secured to the connector using an adhesive or in an insert molding method. Such a kind of suction cup is useful even now.

However, this suction cup is problematic in that a gap may be formed in a junction between the connector and the pad when it is used for some time, so that external air may be introduced into the gap.

Further, this suction cup is problematic in that, even though only the pad is damaged, the entire suction cup should be replaced.

Conventionally, a so-called pressure ring was used to solve the above-described problems. That is, in the state where an upper end of the pad is coupled to an outer surface or an inner surface of the metal connector, the pressure ring is forcibly fitted over a surface of the flexible pad to strongly push the pad and thereby allow the connector to be in close contact with the pad. Vacuum cups disclosed in Korean Patent Nos. 932775, 1068954, 1195176 and the like belong to these examples. Indeed, the suction cup configured as such is useful to prevent vacuum leakage.

However, this is problematic in that the pad may be damaged during the assembly of the pressure ring, and it is virtually impossible or difficult to separate the pressure ring and the pad after they are assembled.

Meanwhile, a pad-separable suction cup has been proposed. Its example is found in a suction cup that is disclosed in US Patent Application Publication No. US 2012/0025053. This will be described in brief with reference to FIG. 1. This disclosed suction cup 1 includes a connector 2 and a pad 4 that are separably assembled with each other via an annular groove 3 and a projection 5 corresponding thereto, and a bellows 6 that is optionally assembled between the connector 2 and the pad 4.

In comparison with the conventional suction cup, the disclosed suction cup naturally ensures that the 'separation' of the flexible pad is relatively convenient.

However, this is problematic in that it is considerably inconvenient to 'assemble' the pad 4, and a coupling between the components 2 and 4 is weak, so that the vacuum leakage may occur in the assembled portion.

When the article is actually held and transferred, the pad 2 may be bent at upper and lower positions. In this case, a gap or an interstice may occur in the assembled portion of the pad 2, thus leading to vacuum leakage from the assembled portion. Moreover, since the connector 2 and the pad 4 are a flexible material, the pad 4 may be unexpectedly separated by a side load of the article.

DISCLOSURE

Technical Problem

Accordingly, the present invention has been made keeping in mind the above problems occurring in the related art, and is intended to provide a novel vacuum suction cup that is configured to afford convenience during disassembly and assembly, to provide stability in a structure where a connector body and a pad are separably coupled to each other, and to prevent a problem wherein vacuum leakage occurs in an assembled portion of the pad.

Technical Solution

In an aspect, the present invention provides a pad-separable suction cup including a hollow body, a skirt-shaped pad disposed under the body, and a ring-shaped clamp provided in the suction cup to couple the body with the pad.

To be more specific, the suction cup may include a hollow body having a passage formed vertically therethrough, an annular protrusion provided on a lower end thereof to extend inwards, and a first inclined portion extending from the protrusion in such a way as to be enlarged towards the lower end; a pad comprising a skirt-shaped member having an internal space that communicates with the passage, and including a second inclined portion that is provided on an upper portion thereof to face and come into contact with the first inclined portion, and a sealing portion that is provided on a lower portion thereof and extends from the second inclined portion to come into contact with a surface of an article; and a clamp comprising a ring-shaped member that is removably provided on a portion of the protrusion, a concave 'C'-shaped outer surface thereof compressing the protrusion and the second inclined portion in opposite directions upwards and downwards while surrounding them, thus coupling the body with the pad.

According to an embodiment, the body may be a ring-shaped member, a member including a bellows 32 extending downwards from the ring-shaped member, or a member including one or more bellows coupled to a lower portion of the ring-shaped member. In order to couple the ring-shaped member with the bellows or couple the bellows with another bellows, the clamp may be preferably applied.

An outer surface of the clamp may be designed to come into close contact with a surface defined by the protrusion and the second inclined portion. Preferably, the clamp may be formed of a harder material than the body and the pad or at least the pad.

Advantageous Effects

As described above, the suction cup according to the present invention is advantageous in that the upper body and the lower pad are coupled to each other by the inner clamp. Here, the clamp is easily removably mounted. The pad can be naturally separated from the body by a free fall due to its own weight when the clamp is removed. Therefore, the suction cup structure wherein the body and the pad are separable is advantageous in that it can improve the convenience of the disassembly and assembly and enhance the stability of the suction cup, in comparison with the related art.

Meanwhile, the suction cup according to the present invention is advantageous in that the separate 'C'-shaped clamp compresses the protrusion of the body and the second inclined portion of the pad in opposite directions upwards and downwards while surrounding them and thereby couples the body and the pad with each other. Therefore, vacuum leakage does not occur in the contact portion and the coupled portion between the body and the pad.

Figure 1:
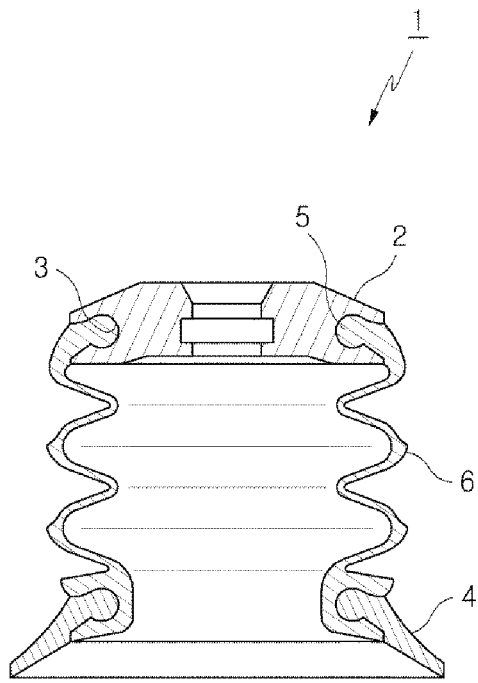
FIG. 1 is a sectional view illustrating a conventional suction cup.

*Description of reference numerals of important parts*

| | |
|---|---|
| 10, 30, 40, 50. suction cup | |
| 11, 31, 41, 51. body | 2. pad |
| 13. fastener | 14. passage |
| 15. protrusion | 16. first inclined portion |
| 17, 17a. groove | 18. second inclined portion |
| 19. sealing portion | 20. step |
| 21. ball portion | 22. heel |
| 23. groove | 24. recess |
| 25. concave portion | 26. mesh filter |
| 27. perforated net | 28. support projection |
| 32, 42. bellows | 43. third inclined portion |
| S. internal space | |

BEST MODE

The above or other features and effects of the pad-separable suction cup (hereinafter referred to as a 'suction cup') of the present invention will be more apparent from first to fourth embodiments of the present invention that will be described with reference to the accompanying drawings. In respective embodiments, components having the same function will be denoted by the same reference numerals.

First Embodiment

Figure 2:
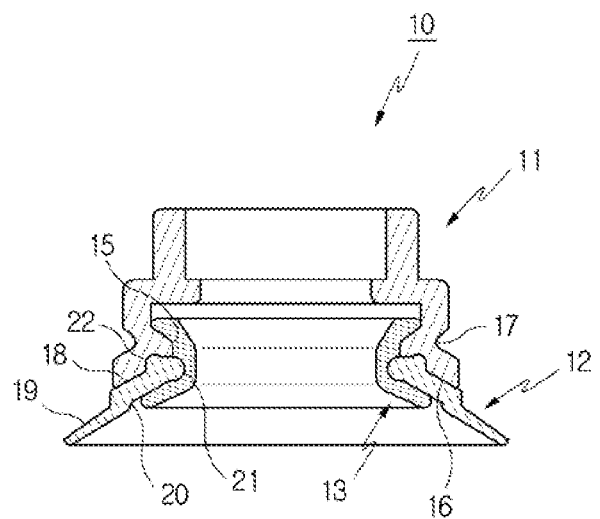
FIG. 2 is a sectional view illustrating a suction cup according to a first embodiment of the present invention.
Figure 3:
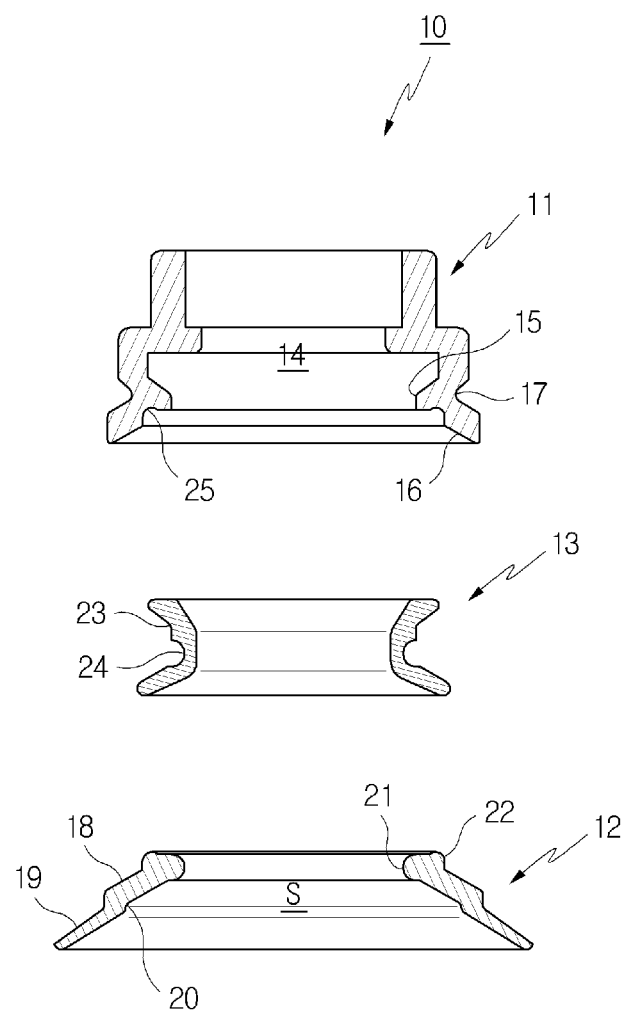
FIG. 3 is an exploded view of FIG. 2.

Referring to FIGS. 2 and 3, a suction cup according to this embodiment is denoted by reference numeral 10. The suction cup 10 includes a hollow body 11, a skirt-shaped pad 12 disposed under the body 11, and a ring-shaped clamp 13 provided in the suction cup 10 to couple the body 11 with the pad 12.

Specifically, the body 11 is a ring-shaped member having a passage 14 that is vertically formed through a center of the body. The body has an annular protrusion 15 formed on a lower end thereof to extend inwards, and a first inclined portion 16 extending from the protrusion 15 in such a way as to be enlarged towards the lower end. Referring to the drawings, in order to cause the first inclined portion 16 to have elasticity, the body 11 includes a circular groove formed on an outer circumference thereof to correspond to the protrusion 15. However, this configuration is not necessarily required in the invention.

The pad 12 is a skirt-shaped pad that is disposed under the body 11 and has an internal space S communicating with the passage 14. The pad integrally includes a second inclined portion 18 that is provided on an upper portion thereof to face and come into contact with the first inclined portion 16, and a sealing portion 19 that is provided on a lower portion thereof and extends from the second inclined portion 18 to come into contact with a surface of an article. Referring to the drawings, the upper second inclined portion 18 and the lower sealing portion 19 are divided into each other by a middle step 20. However, they may be divided into each other by a contact or non-contact state with the first inclined portion 16.

The clamp 13 is a ring-shaped member that has a concave section and an approximately 'C'-shaped outer surface. In the state where the first inclined portion 16 faces and comes into contact with the second inclined portion 18, the clamp 13 is provided in the suction cup 10. The clamp 13 compresses the protrusion 15 and the second inclined portion 18 in opposite directions upwards and downwards while surrounding them, thus coupling the body 11 with the pad 12. This clamp 13 may be mounted to the interior of the suction cup 10 to be easily removed therefrom as necessary. In the case where the clamp 13 is removed from the suction cup 10, the pad 12 may be naturally separated while the contact with the body 11 is released by its own weight.

Preferably, the clamp 13 is formed of a harder material than the body 11 and the pad 12 or at least the pad 12. According to this feature, the pad 12 formed to be relatively thin using a soft material such as rubber, silicone or urethane can be safely coupled to the clamp 13. Further, a strong compressive force is provided between the first and second inclined portions 16 and 18 that face and come into contact with each other when the upper and lower components 11 and 12 are coupled with each other, thus being very effective in preventing vacuum leakage from the contact or coupled portion. Incidentally, the above-mentioned feature makes it easy to removably mount the clamp 13 itself.

As another measure for providing the above-mentioned coupling force and prevention of vacuum leakage, the clamp 13 is designed such that an outer surface thereof is in close contact with surfaces of the protrusion 15 and the second inclined portion 18. As shown in the drawings, the surfaces include the surface of the protrusion 15 and a ball portion 21 that is roundly formed on an upper end of the second inclined portion 18. Here, the outer surface of the clamp 13 has a groove 23 corresponding to the protrusion 15 and a recess 24 corresponding to the ball portion 21.

Further, a heel 22 located behind the ball portion 21 may come into contact with the lower portion of the protrusion 15 or a concave portion 25 formed in the second inclined portion 18. Such a configuration allows a load transmitted from the pad 12 to be dispersed on the body 11 and the clamp 13, thus ensuring the firm coupling of the pad 12.

Figure 4:
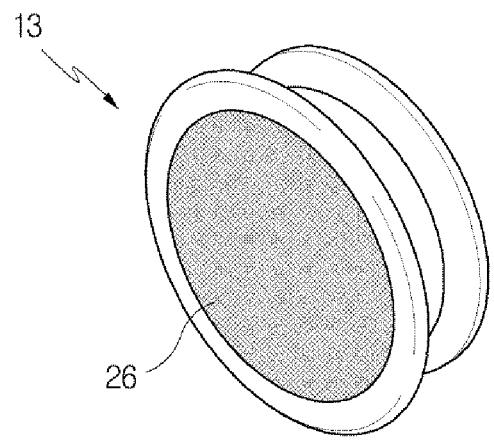
FIGS. 4 to 6 are views illustrating the use of a clamp that is applicable to FIG. 2.
Figure 5:
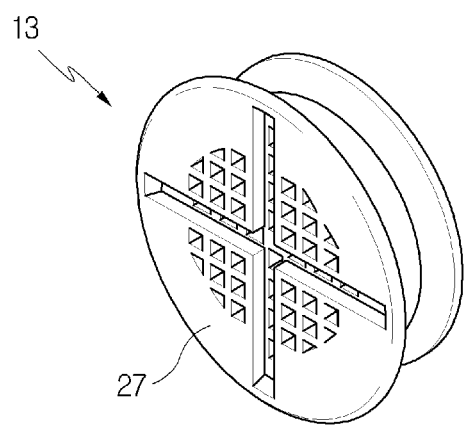
Figure 6:
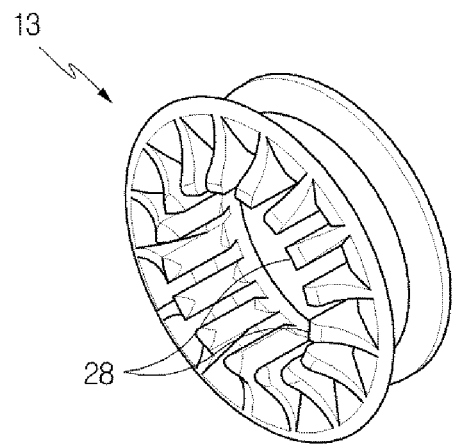

In the above drawings, the clamp 13 is a simple ring-shaped member that is shaped to allow air present in the internal space S of the pad 12 to be exhausted through the passage 14 without any resistance. However, depending on the characteristics of an article to be held, a required configuration may be provided on an opening defined under the clamp 13. FIGS. 4 to 6 illustrate a mesh filter 26, a perforated net 27 and a support projection 28 that are applicable to the clamp 13, respectively. The mesh filter 26, the perforated net 27 and the support projection 28 may be appropriately used for preventing the formation of a suction mark, for sucking a paper pack, and for sucking vinyl, respectively.

Second Embodiment

Figure 7:
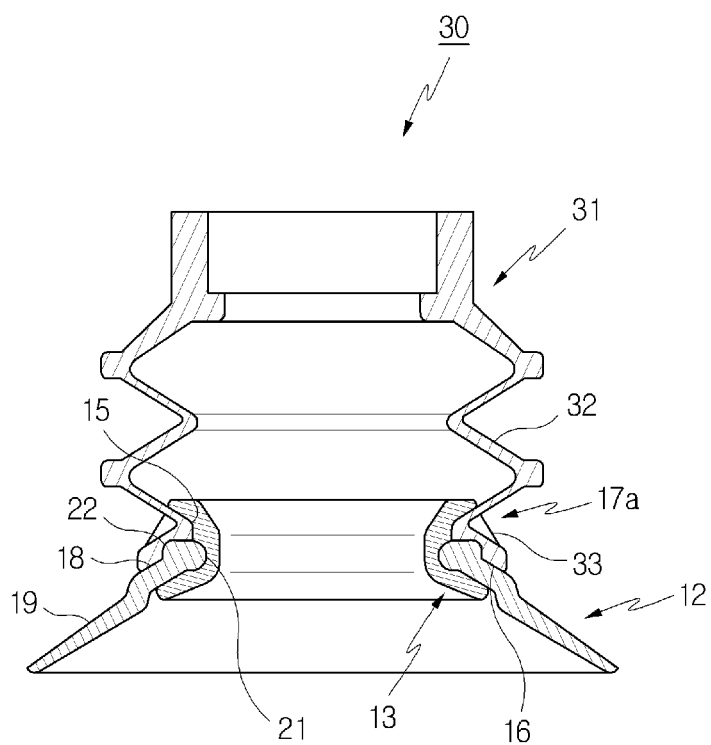
FIG. 7 is a sectional view illustrating a suction cup according to a second embodiment of the present invention.
Figure 8:
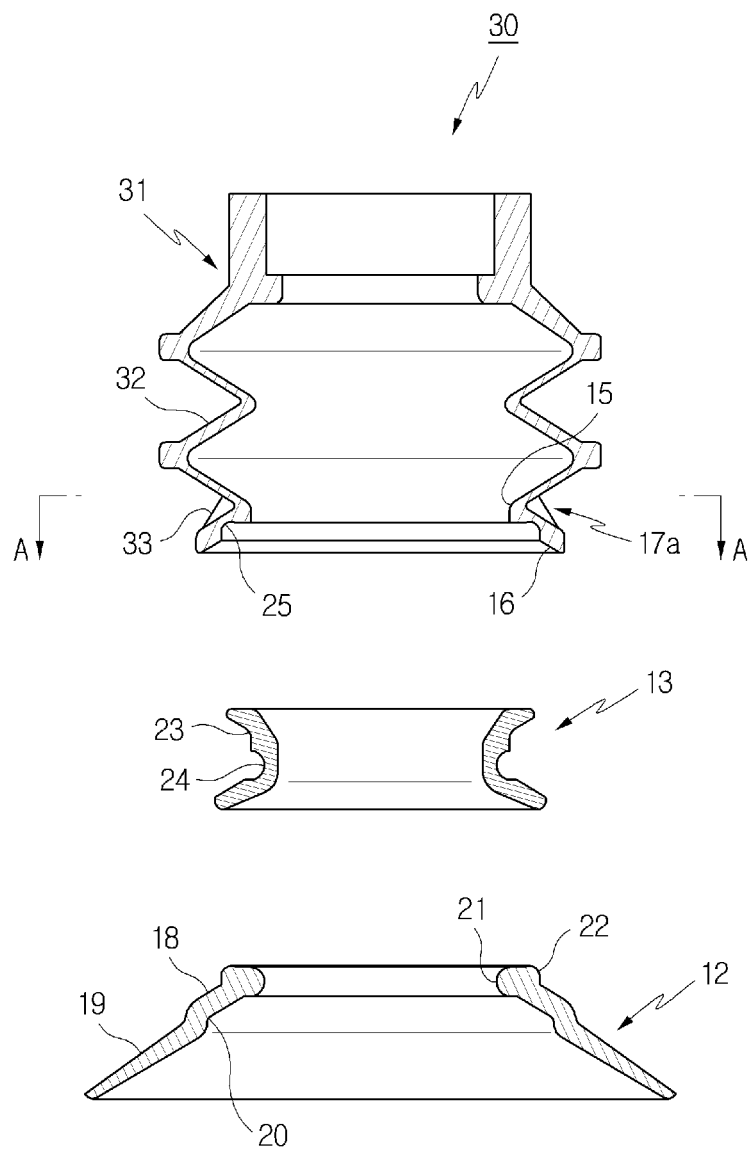
FIG. 8 is an exploded view of FIG. 7.

Referring to FIGS. 7 and 8, a suction cup according to this embodiment is denoted by reference numeral 30. The suction cup 30 includes a hollow body 31, a skirt-shaped pad 12 disposed under the body 31, and a ring-shaped clamp 13 provided in the suction cup 30 to couple the body 31 with the pad 12.

Here, the body 31 includes a ring-shaped member described in the [first embodiment], and a bellows 32 extending downwards from the ring-shaped member. That is, the body 31 is formed such that the upper ring-shaped member and the bellows 32 extending downwards therefrom are integrated with each other. Since the specific shape, structure, function, and others of the protrusion 15 provided on a lower end to constitute the body 31, the first inclined portion 16, the pad 12 and the clamp 13 are technically identical to those in the above [first embodiment] except that they are merely designed using the lower end of the bellows 32, a detailed description thereof will be omitted herein.

As is well-known, the bellows 32 refers to a flexible pipe that is hollow therein, and functions to relieve shocks occurring when the pad 12 comes into contact with the surface of the article. However, the bellows 32 may be crushed or twisted by negative pressure generated in the suction cup 30. This may cause an interstice or a gap between the clamp 13 and the protrusion 15. In order to prevent such an interstice or gap, according to this embodiment, a plurality of reinforcing ribs 33 is formed in a circular groove 17a that is provided at a position on an outer circumference corresponding to the protrusion 15 of the body 31.

Figure 9:
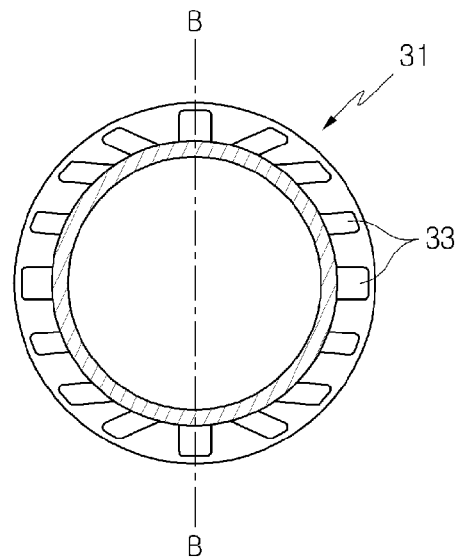
FIG. 9 is a plan view taken along line A-A of FIG. 8.

Referring to FIG. 9, the reinforcing ribs 33 are not formed in one direction or radially, but are formed leftwards or rightwards with respect to a central line B-B. This is considerably advantageous in the process of forming the bellows 32 including the reinforcing ribs 33. The reinforcing ribs 33 may be effectively applied to other embodiments of the present invention, regardless of whether the ribs are shown or not.

Third Embodiment

Figure 10:
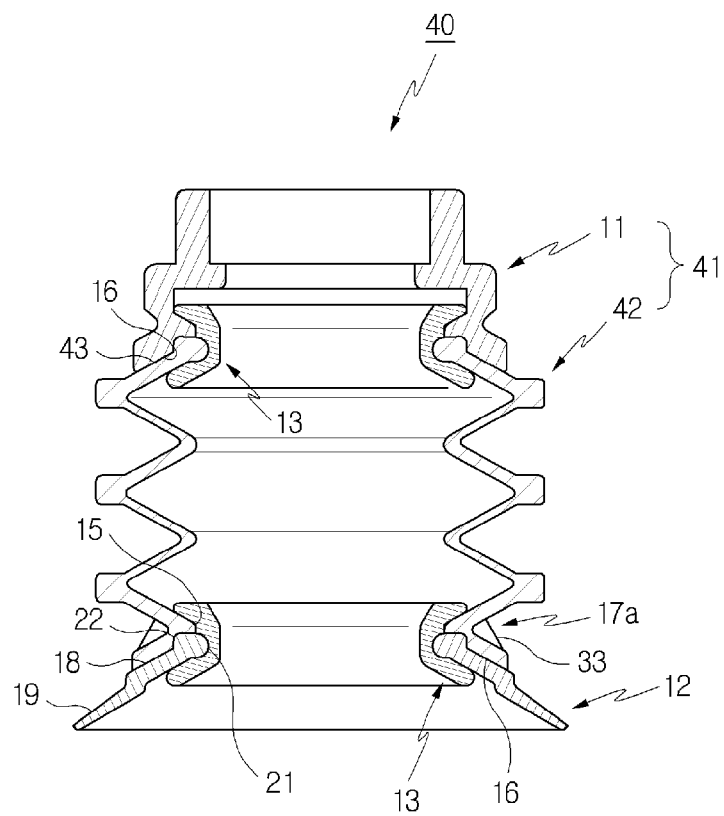
FIG. 10 is a sectional view illustrating a suction cup according to a third embodiment of the present invention.

Referring to FIG. 10, a suction cup according to this embodiment is denoted by reference numeral 40. The suction cup 40 includes a hollow body 41, a skirt-shaped pad 12 disposed under the body 41, and a ring-shaped clamp 13 provided in the suction cup 40 to couple the body 41 with the pad 12.

Here, the body 41 includes a ring-shaped member described in the [first embodiment], and a bellows 42 coupled to a lower portion of the ring-shaped member. Preferably, the clamp 13 is used as a coupling member between the ring-shaped member and the bellows 42 of the body 41. To this end, the ring-shaped member of the body 41 has the same configuration as the body 11 of the [first embodiment], and the bellows 42 has an upper-end configuration having the same shape as the second inclined portion 18 of the pad 12.

Specifically, the bellows 42 includes a third inclined portion 43 that is provided on an upper portion thereof to face the inclined portion 16 of the body 11, and further includes a ball portion 21 that is roundly formed on an upper end of the third inclined portion 43. The clamp 13 is provided in the suction cup 40 with the first and second inclined portions 16 and 43 facing and coming into contact with each other, and compresses the protrusion 15 and the third inclined portion 43 while simultaneously surrounding them, thus coupling the body 11 with the bellows 42. As another measure for providing the above-mentioned coupling force and prevention of vacuum leakage, the clamp 13 is designed such that an outer surface thereof is in close contact with surfaces of the protrusion 15 and the second inclined portion 18.

The clamp 13 coupling the body 11 with the bellows 42 may be mounted to the interior of the suction cup 10 to be easily removed therefrom as necessary. In the case where the clamp 13 is removed from the suction cup 10, the bellows 42 may be naturally separated while the contact with the body 11 is released by its own weight.

Since the specific shape, structure, function, and others of the protrusion 15 provided on a lower end to constitute the body 41, the first inclined portion 16, the pad 12 and the clamp 13 are technically identical to those in the above [first embodiment] except that they are designed only using the lower end of the bellows 42, a detailed description thereof will be omitted herein.

Fourth Embodiment

Figure 11:
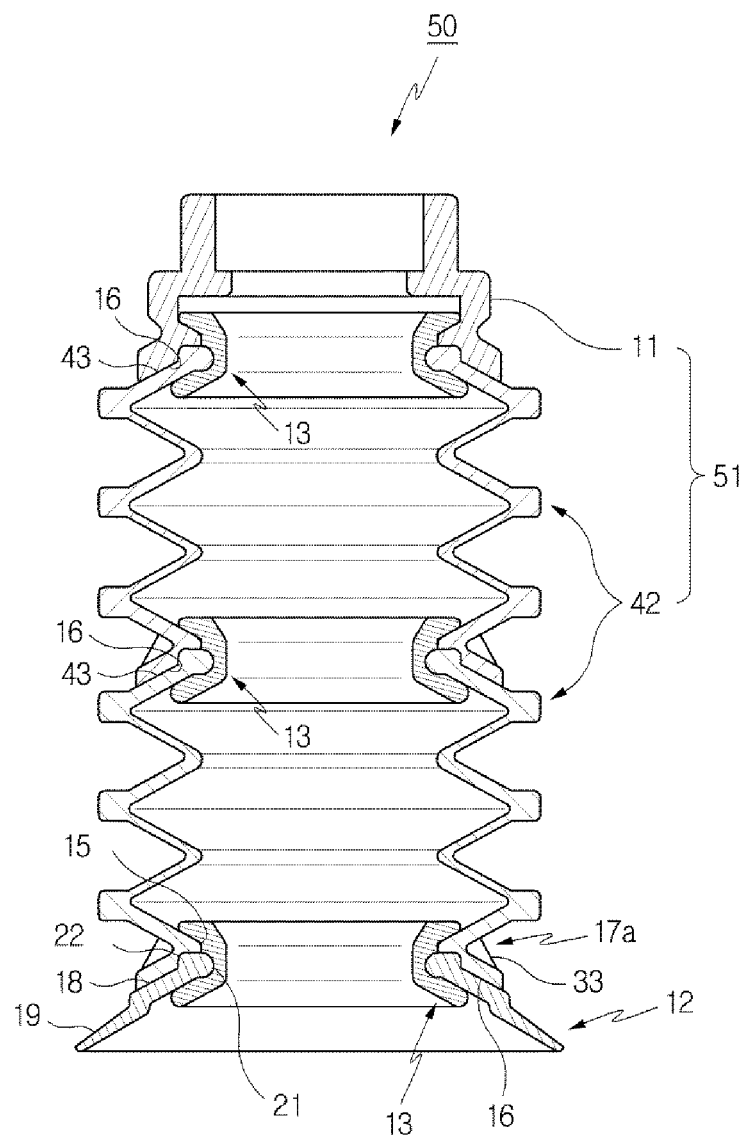
FIG. 11 is a sectional view illustrating a suction cup according to a fourth embodiment of the present invention.

Referring to FIG. 11, a suction cup according to this embodiment is denoted by reference numeral 50. The suction cup 50 includes a hollow body 51, a skirt-shaped pad 12 disposed under the body 51, and a ring-shaped clamp 13 provided in the suction cup 50 to couple the body 51 with the pad 12.

Here, the body 51 includes a ring-shaped member 11 described in the [first embodiment], and two or more bellows 42 successively coupled to a lower portion of the ring-shaped member. Here, the bellows 42 is the same as the [third embodiment] in terms of a structure. Thus, the clamp 13 may be effectively applied to couple the bellows 42 to each other.

Since the specific shape, structure, function, and others of the protrusion 15 provided on a lower end to constitute the body 51, the first inclined portion 16, the pad 12 and the clamp 13 are technically identical to those in the above [first embodiment] except that they are designed only using the lower end of a terminal bellows 42, a detailed description thereof will be omitted herein.

The invention claimed is:

1. A pad-separable suction cup comprising:
    a hollow body having a passage formed vertically therethrough, an annular protrusion provided on a lower end thereof to extend inwards, and a first inclined portion extending from the protrusion in such a way as to be enlarged towards the lower end;
    a pad comprising a skirt-shaped member having an internal space (S) that communicates with the passage, and including a second inclined portion that is provided on an upper portion thereof to face and come into contact with the first inclined portion, and a sealing portion that is provided on a lower portion thereof and extends from the second inclined portion to come into contact with a surface of an article; and
    a clamp comprising a ring-shaped member that is removably provided on a portion of the protrusion, a concave 'C'-shaped outer surface thereof compressing the protrusion and the second inclined portion in opposite directions upwards and downwards while surrounding them, thus coupling the body with the pad.

2. The pad-separable suction cup according to claim 1, wherein the body is a ring-shaped member, a member including a bellows extending downwards from the ring-shaped member, or a member including one or more bellows coupled to a lower portion of the ring-shaped member.

3. The pad-separable suction cup according to claim 2, wherein the bellows is coupled to the lower portion of the ring-shaped member, and the ring-shaped member is a hollow body including a passage formed vertically therethrough, an annular protrusion provided on a lower end thereof to extend inwards, and a first inclined portion extending from the protrusion in such a way as to be enlarged towards the lower end,
    the bellows has on an upper end thereof a third inclined portion that faces and comes into contact with the first inclined portion,
    an outer surface of the clamp compresses the protrusion and the third inclined portion in opposite directions upwards and downwards while surrounding them, thus coupling the body with the bellows.

4. The pad-separable suction cup according to claim 3, wherein the same bellows are continuously coupled to a lower portion of the bellows, and an outer surface of the clamp compresses the protrusion and the third inclined portion in opposite directions upwards and downwards while surrounding them, thus coupling two bellows with each other.

5. The pad-separable suction cup according to claim 1, wherein the clamp is formed of a harder material than the body and the pad or at least the pad.

6. The pad-separable suction cup according to claim 1, wherein the clamp is a simple ring-shaped member or a member further including a mesh filter, a perforated net or a support projection in an opening formed on a lower portion of the ring-shaped member.

7. The pad-separable suction cup according to claim 1, wherein an outer surface of the clamp is designed to come into close contact with a surface defined by the protrusion and the second inclined portion or a third inclined portion.

8. The pad-separable suction cup according to claim 7, wherein the surface comprises a ball portion that is roundly formed on an upper end of a contact portion, and the outer surface comprises a recess corresponding to the ball portion.

9. The pad-separable suction cup according to claim 8, wherein a heel located behind the ball portion comes into contact with a concave portion formed on a lower portion of the protrusion or the second inclined portion.

10. The pad-separable suction cup according to claim 1, wherein the body comprises a plurality of reinforcing ribs in a circular groove formed at a position on an outer circumference corresponding to the protrusion.

11. The pad-separable suction cup according to claim 10, wherein the reinforcing ribs are formed to extend leftwards or rightwards with respect to a central line (B-B).

\* \* \* \* \*